Dec. 25, 1962 P. F. EILAND, JR 3,069,906
ANGLE-OF-ATTACK DETERMINING DEVICE
Filed May 6, 1959
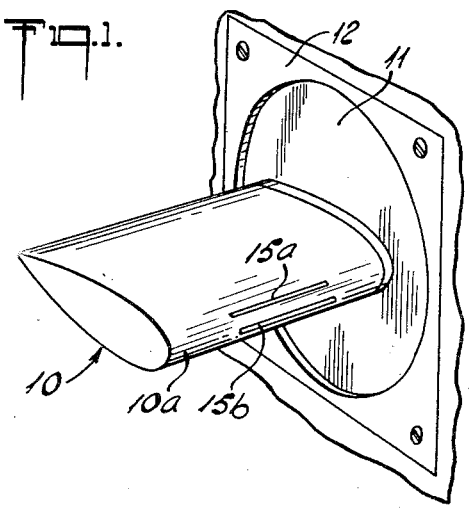
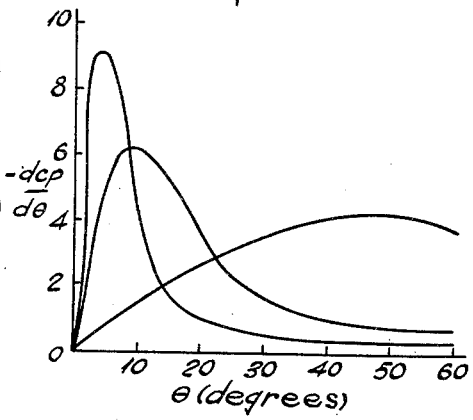
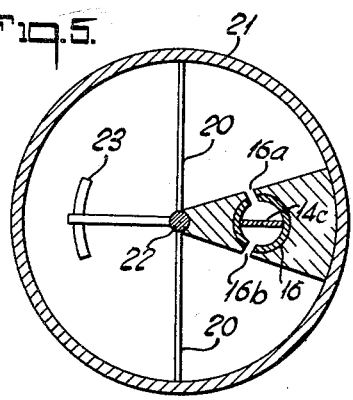
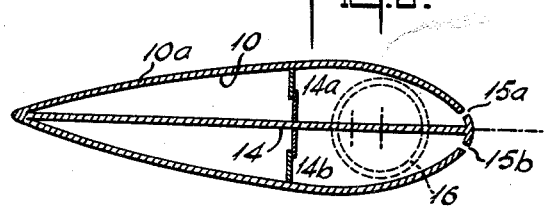
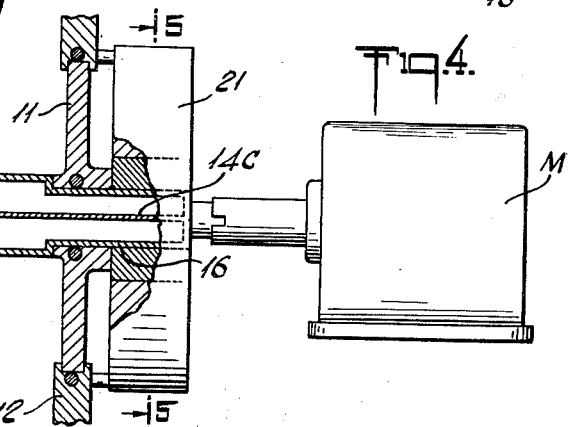
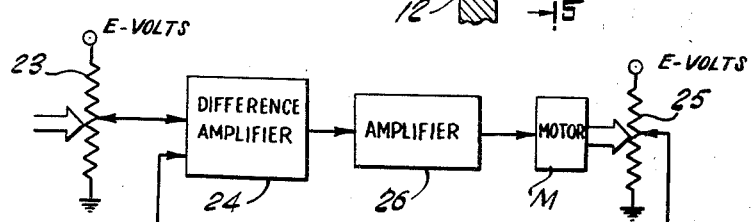
INVENTOR
PHILLIP F. EILAND JR.
BY
ATTORNEYS

United States Patent Office 3,069,906
Patented Dec. 25, 1962

3,069,906
ANGLE-OF-ATTACK DETERMINING DEVICE
Phillip F. Eiland, Jr., Centre Hall, Pa., assignor, by mesne assignments, to HRB-Singer, Inc., State College, Pa., a corporation of Delaware
Filed May 6, 1959, Ser. No. 811,439
5 Claims. (Cl. 73—180)

This invention relates to devices for determining or measuring the wind direction or angle-of-attack of an air stream relative to a body in the stream. Such device generally involves a differential air pressure sensor or probe and a servo system responsive to pressure sensed by the probe for moving it to null relation with the air velocity vector and coincidentally operating means for indicating the angle-of-attack relative to a reference axis of the probe or relative to a reference axis of a body carrying the probe.

The present invention is directed to an improved angle-of-attack determining device to function with superior accuracy, reliability and sensitivity in evaluating the angle-of-attack, particularly a very small change in angle-of-attack in the order of a fraction of a degree. Toward this objective, the invention features an end-pivoted probe with a leading end or head of elliptical profile having pressure sensing elements or pressure ports symmetrical with respect to a reference axis of the probe and each element located at an angle to the ellipse center most favorable for detecting an incremental change in pressure resulting from an incremental change in angle-of-attack.

The subject sensor is particularly an improvement on the prior type of sensor characterized by an end-pivoted cylinder presenting a semi-circular contour to the wind force. Departing from the prior form of sensor head, the present invention provides the probe or sensor with an elliptically profiled head consisting of at least a semi-ellipse facing endwise into the wind and producing a pressure differential far superior to that exhibited under the same conditions by the semi-circular probe head of the prior art. The probe constructed according to the invention is therefore far more sensitive to a small deviation in angle-of-attack than the prior art probe. According to the invention, sensitivity of the subject probe is further increased by locating the pivot axis of the probe eccentrically of the center of elliptical curvature of the probe head and as far forward of the center of pressure as practical, thus introducing the wedge or weather vane principle as a factor in the action of the probe. Hunting tendency of the probe will be diminished by fairing the probe from the tail of the elliptically curved head to form a streamlined afterbody. This will cause the center of pressure to shift toward the rear and also will increase the plan form area and stability of the probe.

Other objects of the invention reside in any novel feature or novel combination of features present in the disclosed device and will appear from the following description, the claims and the drawings wherein:

FIG. 1 is a perspective view of the probe and its mounting plate;

FIG. 2 is an enlarged section taken across the probe at a right angle to its reference axis;

FIG. 3 is a chart in which the pressure coefficient derivatives versus angles are plotted for a probe with a circular profile and for elliptical probes of 2/1 and 3/1 ratios;

FIG. 4 is a longitudinal sectional view through the probe and shows related elements;

FIG. 5 is a view taken substantially in the direction shown by the arrows 5—5 in FIG. 4; and FIG. 6 is a schematic view of the servo system employed with the invention.

Before explaining the theoretical considerations underlying the invention, the mechanism exemplifying the invention will be described.

The invention includes a hollow vane-like sensor or probe 10 of uniform cross section from end to end. The outer end of the probe is closed; the inner or right hand end (as viewed in FIG. 4) is fixed onto the face of a disk 11 having rotatable fit in a mounting plate 12 as suggested by ball bearings, attachable to an airfoil or other support. The probe is thus journaled for pivotal movement about an axis extending across the direction of relative motion between the air stream and the probe. The leading end or head 10a of the probe has an elliptical profile and tails off into a streamlined afterbody, the entire probe from front to rear being symmetrically contoured about a longitudinal axis in the same plane as the pivot axis but at right angle thereto. The angle between the air velocity vector and the longitudinal axis, with the pivot axis as a vertex, is the angle-of-attack to be measured and may be positive or negative depending on whether the air velocity vector is directed downwardly or upwardly toward the longitudinal axis. When the air velocity vector is in line with the longitudinal axis, the angle-of-attack is zero and the probe is in a null position.

The probe is divided in the interior into symmetrical air chambers by a thin partition 14. The cross-sectioned area of the chambers and, therefore, the volume of the pressure lines may be adjusted by partitions 14a and 14b to obtain the desired pressure response times. The partitions are preferably made of plates adjustable in height. Slots 15a and 15b in the probe head 10a form inlet ports for the respective air chambers. The partition 14 is narrowed at the right hand end to provide an extension 14c (FIG. 4) entering a tubular shaft 16 and dividing the interior of the shaft into upper and lower air ducts opening respectively into the upper and lower air chambers in the probe. Shaft 16 is fixed into the hub of the disk 11 and is closed at the right hand side where it is coupled to the shaft of a servo motor M. Pressures in the air chambers and ducts are transmitted via outlets 16a and 16b (FIG. 5) in shaft 16 to the arms of a paddle 20 within a pneumatic pot 21. The central, pivot shaft 22 of the paddle carries a slider of a potentiometer 23.

When the air velocity vector is at an angle to the longitudinal axis of the probe, a difference in pressure appears at the ports 15a and 15b of the probe and results in a proportional angular displacement of the paddle 20 in one or another direction depending on whether the air pressure at port 15a or 15b is greater. The slider of potentiometer 23 takes a corresponding angular position and determines the voltage applied via the potentiometer to a difference amplifier 24 (FIG. 6). Another potentiometer 25 is settable according to the position of the shaft of servo motor M and transmits a voltage to the difference amplifier to be compared with the voltage received from the potentiometer 23. The difference between these voltages is amplified by 24 and transmitted to a further amplifier 26 which applies its output to the servo motor M. In response to this output, the motor turns in a direction and to an extent bringing the probe to null position relative to the wind direction. The local angle-of-attack is the angle through which the probe is moved to bring it to null position and may be indicated by means associated with or controlled by the potentiometer 25. Any equivalent closed loop servo system may be used in place of the one shown in FIG. 6.

The shaping of the probe head 10a elliptically in accordance with the invention renders the probe far more sensitive to a small change in angle-of-attack than the prior art probe having a circular profile, as will now be explained. The sensitivity of a probe is proportional to the pressure differential for a small impulse change in the angle-of-attack. The potential flow equation for the pressure coefficient of a probe with a circular profile is $$Cp = \frac{2(P_1 - P_0)}{\rho v^2} = 1 - 4\sin^2\theta$$

where $Cp$ is the pressure coefficient; $P_1$ is the pressure at point $P_1$ on the surface; $P_0$ is the ambient pressure; $\rho$ is the air density; $v$ is the free stream velocity of air; $\theta$ for a circle is the angle between the longitudinal axis and a radial line from the center $P_1$ and the derivative is $dC_p/d\theta$. The maximum occurs at plus or minus 45 degrees and has a value of $-4$/degree. The plot of this derivative versus angle is shown in FIG. 3. Also appearing in this chart are the plots of the pressure coefficient derivatives for probe heads conforming to the curvatures of ellipses of 2/1 and 3/1 axial ratios and aligned with their major axes parallel to the wind vector. It is seen that the circularly profiled head or cylinder has the least maximum pressure differential. Examination of the plot of the 2/1 ellipse shows the maximum to occur at 8 degrees measured from the center of the ellipse. The value of the derivative at this point is approximately $-6$/degree. Consequently, a probe head with this elliptical profile will produce the same pressure differential as the cylinder for an impulse change in angle-of-attack which is 2/3 that of the cylinder or, in other words, will produce 50 percent more pressure for identical impulses. Based on this, the elliptically profiled head is much more sensitive than the circularly profiled probe. By increasing the axial ratio to 3/1 for the elliptical profile of the probe head, the same pressure differential can be obtained at one-half the angle-of-attack impulse deviation required by the cylinder; that is, for an equal deviation the 3/1 elliptical profile obtains double the pressure obtained by the cylinder.

A rough quantitative performance comparison of the cylinder and the ellipses can be calculated in the following manner:

The pressures at the top and bottom slots or pressure ports of the probe are given by the following equations:

$$P_{top} = \frac{1}{2}(C_p - C'_p \Delta\theta)\rho u^2 + P_0$$
$$P_{bottom} = \frac{1}{2}(C_p - C'_p \Delta\theta)\rho u^2 + P_0$$

where $P_{top}$ is the pressure at the top port ($15a$) when $\theta$ is changed to $\theta + \Delta\theta$; $P_{bottom}$ = pressure at the bottom port ($15b$) when $\theta$ is changed to $\theta + \Delta\theta$; $\theta$ for an ellipse is the angle between the major axis and the line from the center of the ellipse to a point $P_1$ on the surface; $\Delta\theta$ is a small change in the angle $\theta$; $u$ is the wind velocity; $P_0$ is the ambient pressure; $\rho$ is the air density and $C'_p$ is equal to $dC_p/d\theta$. The pressure difference is then $\Delta p = C'_p \rho \Delta\theta u^2$.

Considering the cylinder, where $C'_p$ maximum is 4 (see FIG. 3), taking $p$ as equal to .002378 slugs/ft.$^3$ at sea level and assuming a wind velocity $u$ of 147 ft./sec. (approximately 90 knots), then for an angle-attack deviation of 0.2 degree ($=\Delta\theta$), the value of $\Delta p$ works out to 41.2 pounds/ft.$^2$. For the probe with 2/1 elliptical head, $C'_p$ maximum is about 6/degrees so that at the same wind velocity, the same angle-attack deviation produces a pressure difference $\Delta p$ of 61.8 pounds/ft.$^2$. For the 3/1 elliptical probe head, under the same conditions and since $C'_p$ has a maximum value of about 9, the pressure difference is about 95 pounds/ft.$^2$.

To provide further comparison between the cylinder and the elliptical heads, the differential pressure formula may be rearranged thus:

$\Delta\theta u^2 = (1.725/C'_p) \times 10^4$
 $= 4.32 \times 10^3$ for the cylinder, with $C'_p$ equal to 4;
 $= 2.88 \times 10^3$ for the 2/1 elliptical head, $C'_p$ equal to 6;
 $= 1.88 \times 10$ for the 3/1 elliptic head, $C'_p$ equal to 9.

The table below shows a comparison of the wind velocities required for these probes to barely sense angle change of $\Delta\theta$.

| $\Delta\theta$ degrees | Cylinder, knots | 2/1 Elliptic Probe, knots | 3/1 Elliptic Probe, knots |
|---|---|---|---|
| 0.1 | 127 | 105 | 84 |
| 0.2 | 90 | 74 | 60 |
| 0.3 | 74 | 59 | 49 |
| 1.0 | 41 | 33 | 27 |

From these comparisons, it is clear that the elliptical form of probe head is considerably more sensitive than the cylindrical probe if used and mounted in the same fashion. Still further sensitivity of the elliptical probe is obtained by locating the pivot axis eccentrically to the ellipse center, with the effect of incorporating a wedge or weather vane action with the internal servo action. In achieving this objective, the pivot axis of the probe is placed as far forward of the center of pressure as practical. Since the shape of the afterbody does not significantly affect the pressure distribution at the leading end or head, the tail of the elliptically profiled head is faired into a streamlined shape, as shown in FIGS. 1 and 2, to cause the center of pressure to shift toward the rear, increase the plan form area and generally improve the stability of the probe.

The probe exemplifying the invention has its probe head formed on a 2/1 elliptical curve and the pressure ports $15a$ and $15b$ are each at the angle $\theta$ of 8 degrees, with the ellipse center as the vertex, this being the critical angle for maximum value of pressure coefficient derivative for this elliptically profiled probe head (see FIG. 3). The probe head profile consists of at least a semi-ellipse in horizontal disposition, as shown; that is, with its major axis along the longitudinal axis of the probe. The pivot axis of the probe is located forwardly of the ellipse center and of the center of pressure on the probe in order to impart a weather vane character to the probe and increase its sensitivity to a small change in the angle-of-attack. A probe constructed according to the invention is sensitive to an extremely small angle-of-attack deviation. Thus, the probe shown with a 2/1 elliptically curved head can reliably sense an angle-of-attack deviation of 0.1 degree at an air velocity vector of approximately 105 knots and can sense smaller angle-of-attack deviations at higher air speeds.

It is to be understood that variations and changes may be made by those skilled in the art in the shown exemplification of the invention without departing from the spirit of the invention. It is intended therefore to be limited only as indicated by the following claims.

What is claimed is:

1. A device for determining the angle-of-attack of an air stream relative to a body immersed in the stream, comprising an end-pivoted probe of uniform cross section from end to end, a support, pivot means for end mounting the probe to the support for rockable movement about a pivot axis crosswise of the air stream, the probe being formed with a head of elliptically profiled curvature, said head being provided with pressure sensing elements symmetrically located to each side of a longitudinal reference axis of the probe in the same plane as the pivot axis but at a right angle thereto, the pressure sensing elements each being at an acute angle to the longitudinal axis, with the ellipse center as the vertex, for producing the maximum pressure differential with respect to an incremental change of angle-of-attack of the air stream relative to the elliptical form of the head.

2. The invention according to claim 1, the angle-of-attack being measured with respect to the longitudinal axis of the probe from the pivot axis as a vertex, said pivot axis and said ellipse center being offset from each other along said longitudinal axis to impart a weather vane characteristic to the probe.

3. The invention according to claim 2, the elliptical profile of the probe head conforming to at least a semi-ellipse having its major axis along said longitudinal axis of the probe, the probe being formed further with a streamlined afterbody faired from the tail of the elliptically profiled head to shift the center of pressure toward the rear, the pivot axis being located forward of the center of pressure and of the ellipse center to enhance weather vane action of the probe, and the streamlined afterbody also increasing the plan form area and stability of the probe.

4. The invention according to claim 1, the probe being hollow, a partition through which the longitudinal axis of the probe passes for dividing the probe interior into upper and lower air chambers, said pressure sensing elements comprising upper and lower inlet ports to the upper and lower chambers, respectively, a difference in pressure at said ports and a resulting difference in pressure in said chambers being developed upon deviation of the effective direction of the air stream from alignment with the longitudinal axis of the probe, said pivot means including a tubular shaft, the partition being narrowed to extend into the shaft and divide its interior into upper and lower ducts respectively opening into the upper and lower air chambers, a pressure transducer including a centrally pivoted paddle for receiving at each arm air pressure from one of the ducts in said shaft so as to be turned to an extent and in a direction determined by the difference in pressure in the ducts resulting from the pressure difference at said ports and in the air chambers whose volumes give the desired system response, when the direction of the air stream relative to the longitudinal axis of the probe is angular, and a servo system including a circuit controlled by the paddle according to the direction and extent of its turning and further including a servo motor coupled to said shaft and controlled by said circuit for rocking the probe about its pivot axis to bring the probe to null position with respect to the air stream direction, the direction and extent of turning of the motor and probe being a measure of the angle-of-attack.

5. The invention according to claim 4, said circuit including a potentiometer settable according to the angular position of of the paddle, another potentiometer settable according to the angular position of the motor shaft and probe, and voltage difference amplifying means receiving comparative voltages determined by the settings of the respective potentiometers and producing an output proportional to the difference between said voltages for controlling the operation of the motor and probe.

References Cited in the file of this patent

UNITED STATES PATENTS

| | | |
|---|---|---|
| 2,029,700 | Boykow | Feb. 4, 1936 |
| 2,294,282 | Cerstvik | Aug. 25, 1942 |
| 2,299,077 | Cole | Oct. 20, 1942 |
| 2,352,955 | Johnson | July 4, 1944 |
| 2,645,123 | Hundstad | July 14, 1953 |
| 2,788,644 | Coulbourn | Apr. 16, 1957 |
| 2,832,217 | Hamren | Apr. 29, 1958 |
| 2,834,208 | Westman | May 13, 1958 |

FOREIGN PATENTS

| | | |
|---|---|---|
| 710,520 | France | June 8, 1931 |
| 876,027 | France | Oct. 12, 1942 |